Figure 2:
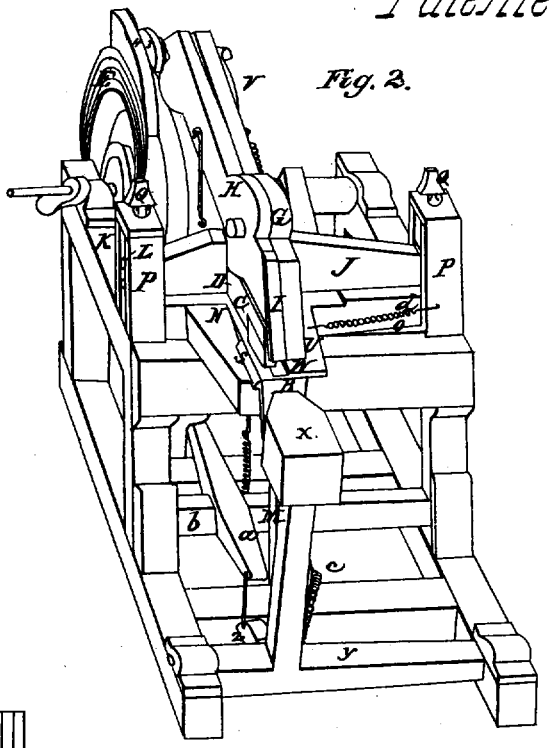
Figure 1:
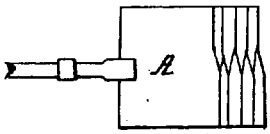
Figure 3:
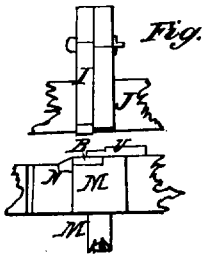
Figure 4:
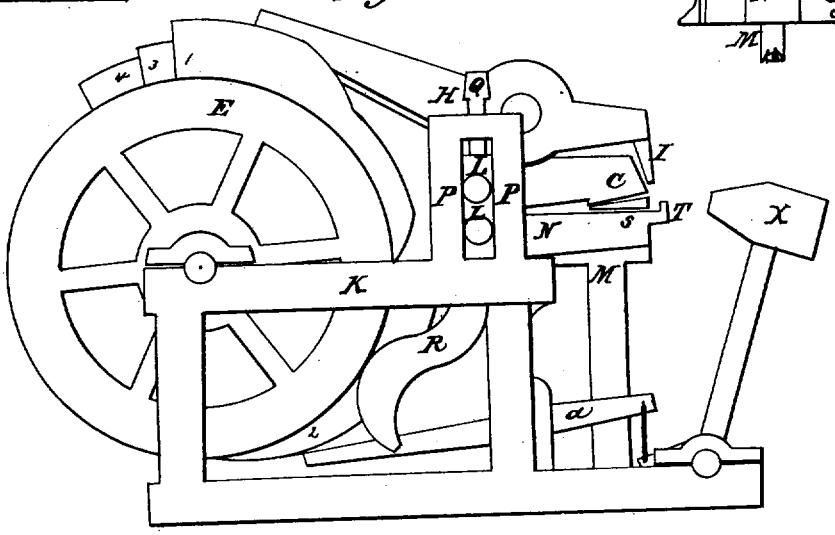

8535X

W. C. Grimes,

Making Wrought Nails,

Patented Dec. 17, 1834.

N. PETERS, PHOTO-LITHOGRAPHER, WASHINGTON, D. C.

William C. Grimes, York Pennsylvania

Letters Patent.

The Schedule referred to in these Letters Patent, and making part of the same, containing a description in the words of the said William C. Grimes, himself, of his improvement in the mode, and Machine for making wrought nails, tacks, or spikes.

To all to whom these presents shall come.

Be it known that I William C Grimes, of York, in the County of York and State of Pennsylvania, have invented a new and useful mode, and Machine for making wrought nails, tacks, or spikes, and that the following is a full and exact description thereof; reference being had to the drawing which accompanies and makes part of this Specification. To make wrought nails by Machinery is an object that has been sought by numerous individuals, hence it may be useful in order to point out more clearly the novelty in the present plan, to refer to the general principles upon which preceding machines or process for that purpose, have been founded.

One of the first, and it is believed an almost universal principle, that has been observed in previous attempts to make wrought nails, has been to make them from rods that were rolled or slit to the size of the larger part of the body of the nail. To taper or to give to the nail its requisite form, from such rods, various modes have been essayed; swaging, forging, and rolling have been tried, but the latter by far then [illegible] it generally. Modifications of these principles to effect the object proposed, have been too numerous to be here detailed, But [illegible] whatever has been the modification of the Machine, it has generally embraced or been constructed to operate upon only one of these principles. The novelty of the present Machine consists in its being constructed so as to combine several of these principles at the same time, viz batting swaging or pressing, and forging, or percussion, and to make the novelty novelty more apparent, the nails &c are not to be made from rods of
the size of the body of the nail, but from broad plates, and these at a
high red heat. These plates are to be prepared by rolling after the
manner of plates for cut nails, but with this difference, they must
be of perfectly sound iron, and two or three times as broad as the length
of the intended nail, but of about the same thickneß. These plates
are to be cut off transversely into pieces about two thirds of the
length of two nails. From the sides of these pieces or plates the
the nails are to be formed and cut, the length of the nail running with
the grain of the iron, or parallel with the length of the original plate.
These plates are held, turned over, and the nails cut from the sides or
ends of them, in the same manner as is practised in making cut nails
but with this difference, in making cut nails the plate is either cold,
or at what is called a black heat, whilst in my proceß the plate
are to be at a high red heat.) In making cut nails they are cut off
with a regular taper from end to end, in this proceß they are tapere
not more than half their length (see drawing marked A). In
making cut nails the width of the plate is the length of the nail. in th
process the plate is cut into lengths transversely, which length forms
two nails by their points overlapping each other A. In making cut nails
the first action upon the nail is to sever it from the plate; in this process th
nail is nearly formed before it is severed from the plate.

As the plates are cut at a high red heat, they would soon destroy th
temper of the steel cutters or dies if continually applied as in making cu
nails, therefore to prevent such injury, I cut a few nails in rapid suc=
cession, and then allow a short intermiſsion, when the plate is with=
drawn, and a jet of water is applied for an instant to the dies which co
tinue in motion, the plate and the jet of water being applied alternately to the
dies. Two or more of these plates should be in the fire at a time, as only a
part of one plate can be cut or formed into nails without reheating. Th
plates may be changed in the furnace, during the time that the jet of wat
is let on to the dies. The water in the pipe that conducts it to the dies sh
be under considerable head or pressure, and starting and stopping the je
may X[illegible]X may be done in various ways, the valves, or cocks may be opened at regu
lar intervals by the machinery, or a treadle may be applied for that purpose.
When the nail is to be formed and cut from the plate, such a portion of the
latter as shall be necefsary, is placed between the jaws or dies B and C.
constructed for the purpose, and which are parallel with the end or edge of
the plate for about half or two thirds of the length of the nail. The remain
der of the dies are turned off at a slight angle, running out to the edge of
the plate, thus forming the taper or point of the nail; the plate is then [illegible]
over, and its opposite side brought into the same position between the jaws,
and another nail is cut, the point of which commences at the same point
in the plate that the taper began in the preceeding nail.
The jaws or dies B and C. are to clamp, prefs, and form the nail, one of them
B. is stationary, whilst the other C, has a vertical movement, this die is
attached to the underside of a jaw or the short end of a lever D, the other
or long end has upon its extremity a projecting cam, which rests upon
the periphery of a heavy fly wheel E, which is about two or three feet in
diameter. The periphery of the fly wheel approaches to within a few inches
of the fulcrum of the lever, while its axis is but a little below the horizon=
tal plane of the said fulcrum, hence the long end of the lever D must
be elevated to an angle of about thirty or forty degrees from the horizon
while the short end is in a horizontal position. The vertical breadth
of this lever D, is much greater than its thicknefs in a horizontal direc=
tion, and in a part G, of its short end nearly over the fulcrum, it rises
into a much greater width; through the centre of this part, pafses a pin,
which is the fulcrum of another lever H, of nearly the same dimensions
as the one to which it is jointed by the aforesaid pin. The short end of
the first named lever D. is so formed that a part of lies directly beneath
the short end of the second, the latter projecting about half an inch over
or beyond the end of the first. To the under side of this projecting part
is attached a piece of steel I, of such size and form as in effect to
lengthen the aforesaid die C, about three eighths of an inch (more or lefs).
In fact the said die may be considered as consisting of two parts, each
susceptible of a motion independent of the other. The length of these
levers levers D and H. for a machine of ordinary size, may be about two feet. The fulcrum of the first lever D, is a strong shaft J, that crosses it at right angles a few inches back of the die C. This shaft lies across the frame K of the machine, it has round trunnions or gudgeons upon its ends, which work in suitable boxes L L fixed in the frame. The lower jaw or die B rests upon permanent fixtures M M M to which it is made fast with keys or screws. The contiguous faces of the dies B and C are parallel, or nearly so for about half or two thirds of their length, the remainder of their faces being inclined towards each other till they meet at their inner ends, or in other words, their faces are so bent or curved, and lie in that relative position, the one to the other, as to give the proper taper, or requisite form to the nail, the latter being with its point towards the fulcrum of the lever D. The side or edges of the jaws or dies next the nail plate, are in the same vertical plane, the one above the other. The nail or edge of the plate being clamped or griped between the dies B and C, as in a vice, and with such a degree of pressure as to give to that portion of the plate the required form or taper of the nail, the jaws or dies biting into, and forcing down a portion of the metal for the taper and point of the nail. The taper of the nail in the other or vertical direction being formed as aforesaid, by the edges of the dies being curved or bent so as to run out to the edge of the plate. A portion of the side of the plate A, when griped as aforesaid projects out beyond the ends of the dies B and C, far enough to allow of the formation of the head of the nail. By the side of the stationary jaw B, there is fixed a strong movable jaw N, which is the short end of a lever the fulcrum of which is a strong horizontal shaft O, lying directly be-neath the fulcrum shaft J, and with similar Journals and boxes, which last are in the same vertical oblong openings with the before named boxes L L, These oblong openings are formed by vertical posts P P, which make a part of the frame K, of the machine. The tops of each pair of these posts are united by a cap piece, through which descends a screw Q of a suitable size, down upon the upper boxes L L, by which means the fulcrum shafts J and O may be set at the requisite requisite distance, the one from the other. The lever R. or long
of the last mentioned jaw, descends from its fulcrum at an
angle of about thirty or forty degrees from a vertical line, its low
end has upon it a steel cam that presses against the periphery o
the fly wheel E, which is made of the necessary width and has upon
it four cams 1.2.3.4, revolving in as many planes. The first cam acts up
the cam or projection on the end of the last mentioned lever R causing
the jaw N. to rise and fall. A strong steel shear S is affixed to the
inside of this jaw N. the edge or upper side of which shear is even
or on a level with the upper face of the lower die B. aforesaid. The
shear is longer than the dies B and C, and projects about half an in
beyond the ends of the jaws, which are all even at their ends, this
projecting part of the shear has but little vertical breadth (about
half an inch more or less) About the fourth of an inch (more or les
beyond the end of the jaw, the projecting part of the shear turns up
(T) at right angles, and rises about the fourth of an inch. This last
projection is a guage against which the side of the nail plate is broug
when nails are being formed from it. A thin and broad lever or side
jaw U working horizontally upon a pin in the stationary jaw, receiv
motion from a cam V. upon the side of the fly wheel E. a part of the
short end of this lever (or rather a steel die W attached to said leve
U) passes in between the dies or jaws B and C. The said die attache
to the lever being of such form and thickness as just to pass in whe
the jaws B and C are closed upon a nail. The side or edge of said
is to be parallel with, and press upon the nail. A heavy hamme
X for striking a head upon the nail, is placed in front of the
end of the jaws B and C. This hammer is fixed upon the end of an
upright rod or helve, the lower end of which is fixed to a horizonta
shaft Y. furnished with round tenons or gudgeons that work in su
able boxes on each side of the frame of the machine. From the side
of this shaft an arm Z projects being inclined downwards; this arm
may be about one third of the length of the said helve. A beam or
lever, whose fulcrum &, is near its centre, lies nearly in a horizonta
position position, with one end beneath the fly wheel, and the other abo
the said short arm to which it is jointed by a link. A cam 2 o
the periphery of the fly wheel, acts upon the end of this lever or
beam, the latter being gradually borne down by it, while the oppo
end of the beam rises, and by its aforesaid connection with th
hammer X, the latter is thrown back to a proper distance, the said ca
2 then terminates abruptly, and by a strong spring c, the hamme
is brought forcibly upon the iron which is to form the head of
the nail. The operation of the Machine is as follows. The plate
A is placed between the jaws B and C, the die W or side jaw
U, being a gauge against which it is put, while the projection on t
end of the shear S. is the gauge in the other direction. A cam b, upo
the periphery of the fly wheel now passes under the end of the
lever, and brings the jaw C down upon the edge of the plate, the
taper of the nail being formed as aforesaid, by the bend o
form of the jaws, which bite off or press down a proper portion
of the edge of the plate to produce the requisite form and taper of th
nail. When the jaws B and C, begin to press upon the edge of the plate the si
jaw U is made to recede from its contact with the edge of the pla
by its lever falling into a cavity in the side of the fly wheel, the lever being kep
in contact with the wheel by a suitable spring d. This side jaw recedes at th
time to allow of the swelling or flowing of the metal farther in betwee
the jaws as they close upon it. The nail being now partly formed, an
firmly griped between the jaws, a cam e upon the side of the fly wheel forces
side jaw in against the nail with great pressure, which assists in giving
to it the requisite form, and it is now firmly compressed on all sides.
The pi e I, depending from the lever H which till now has had its low
side coinciding with the under surface of the jaw or die C, suddenly
rises from the part of the nail which is to form the head, upon which it has re
and serving as a shear to sever this part of the nail from the plate. The sudd
rising of this piece or kind of shear I is effected by the end of the lever H.
falling abruptly from a cam l. on the periphery of the fly wheel. The
height to which this piece rises is such as to prevent it from interferi
with

8535X with the heading of the nail, the projecting part of the shear ha
previously risen to the same height, leaving an even surface w
the projecting and of the nail, against which the hammer now
comes with a force that instantly forms the head of the nail; th
hammer immediately recedes a little, the jaw N and shear S, n
rise tile they are above the nail, then the jaws B. and C. relea
their gripe upon it, the side jaw or die W. is swung by the cam V.
quite through between the jaws B and C, the nail is thus force
out sideways beneath the shear jaw N, and falls finished fro
the machine. — The jaws now instantly resume their former p
sition, the plate is again applied, when as before another na
is formed in like manner. I intend sometimes to form the hea
upon the nail by pressure, instead of percussion.
Any competent power may be employed to impel the machi
Machines greatly differing in form and in the particular a
rangement of the respective parts, may be constructed up
the preceding principle to produce similar results, or effe
the same end by similar means. I therefore, do not inten
to limit myself to the particular arrangement herein specif
but to change such form and arrangement as I may think proper, whi
the principle remains unchanged.

What I claim as new, and as my invention and for whi
I ask letters patent, is, 1st, the making or forming wrought
nails, tacks, or spikes, from or upon the edges or sides of metal
plates, by pressure and cutting, after the manner or upon the princip
herein specified. 2nd The manner of severing the plate from the
so that a part of the latter is left standing out beyond the end of
jaws, as hereinbefore described. 3.rd the side jaw by which
plate is gauged, and the nail compressed and removed from
the jaws. 4th I also claim the general construction and combina
of the respective parts of the above described Machine, by which genera
combination of the respective parts of the above described Machine by
general combination it derives that character by which any [illegible]
complete

[illegible]

competent Machinist will readily distinguish it from any of the various nail Machines heretofore in use.

But I do not claim as my invention, the fly wheel, cams, levers or any other part of the machine taken seperately and individually; but as aforesaid, the combination of these parts upon the principle herein fully set forth. Nor do I claim the forming of nails from nail plates, by cutting them with the grain, that having been already done, but in this particular. I confine myself to the peculiar manner in which the cutting is effected.

Exd Witnesses

WJL

Robt. Clarke

Ziba Webb

Wm. C. Grimes

[3398 words

Drawing